(No Model.)
D. H. RICE.
WHEEL FOR VELOCIPEDES.
No. 348,692. Patented Sept. 7, 1886.
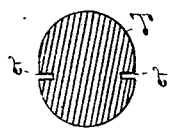
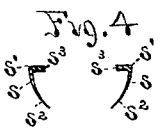
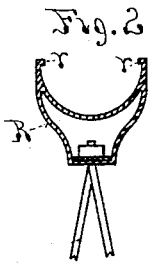
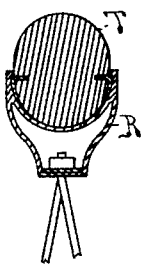
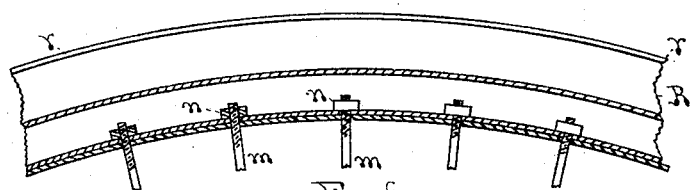
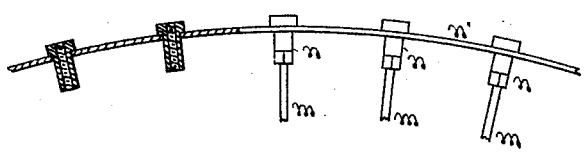
Witnesses
Wm. S. Brown
N. P. Ockington.
Inventor
David Hall Rice
N. PETERS, Photo-Lithographer, Washington, D. C.

UNITED STATES PATENT OFFICE.

DAVID HALL RICE, OF BROOKLINE, MASSACHUSETTS.

WHEEL FOR VELOCIPEDES.

SPECIFICATION forming part of Letters Patent No. 348,692, dated September 7, 1886.

Application filed June 21, 1886. Serial No. 205,783. (No model.)

*To all whom it may concern:*

Be it known that I, DAVID HALL RICE, of Brookline, in the county of Norfolk and State of Massachusetts, have invented a new and useful Improvement in Wheels for Bicycles and Tricycles, of which the following is a specification.

My invention relates to wheels for bicycles and tricycles; and it consists in certain new and useful combinations and constructions of certain parts thereof, substantially as hereinafter described and claimed.

In the drawings, Figure 1 is a longitudinal section of a portion of a wheel-rim and spokes constructed according to my invention. Fig. 2 is a transverse section of the same. Fig. 3 is a transverse section of the tire. Fig. 4 is a transverse section of the clamps used to hold the tire in the rim. Fig. 5 is a transverse section of the rim, tire, and clamps when in position for use. Fig. 6 is a side view, partly in section, of the spoke-nuts attached to their ribbon of metal. Fig. 7 is a side view of a modification of Fig. 6, also partly in section.

R is the rim of the wheel rolled out of tubing or formed hollow in the customary manner.

T is the rubber tire, which is placed in the outer concavity of the rim, as shown in Fig. 5. In order to secure the tire more firmly in the rim I construct the latter with two inwardly-projecting short lips, $r\, r$, extending horizontally over the concavity therein from its upper corners. These short lips form with the vertical inner walls of the rim internal corners on their under sides right angled or slightly acute all around the wheel. Two strips or ribbons of steel or similar elastic material, $s\, s$, are rolled out of sufficient length to extend around the rim, with external corners, $s'\, s'$, fitting the said internal corners of the rim, and with vertical portions $s^2\, s^2$ fitting the concavity of the rim underneath the tire, and horizontal portions $s^3\, s^3$ fitting the grooves $t\, t$ in the tire on each side. The strips $s\, s$ first have their projecting parts $s^3\, s^3$ placed in the grooves $t\, t$ around the tire, and they and the tire are then sprung into place in the rim, as shown in Fig. 5, with the corners $s'\, s'$ under the lips $r\, r$. Any attempt to spring the tire out of the rim by twisting it will now be found to bind the strips $s\, s$ more firmly under the lips $r\, r$ of the rim, owing to the pressure of the rubber produced against their parts $s^2\, s^2$ by the twisting motion. At the same time the projections $s^3\, s^3$ of the strips $s\, s$ are free to yield radially inward around the wheel, with the rubber tire under compression, and do not form anvils against which the overhanging part of the rubber tire is compressed and beaten, as would be the case if the projections $s^3\, s^3$ were mere continuations of the lips $r\, r$, thus impairing the efficiency of the tire.

In order to introduce the spokes into the hollow rim of the wheel it has been customary to cut away the wall of the rim underneath the tire where each spoke entered the rim and introduce into the hollow rim a nut through this aperture to be screwed onto the spoke. This cutting away weakened the rim seriously, and, consequently, impaired the strength of the wheel. To avoid this I form the nuts $n\, n$, Fig. 6, upon a ribbon of metal, $n'$, or braze them upon it so that their centers shall be the same distance apart as the centers of the holes through the inner lower face of the rim which receive the spokes $m\, m$. I then bore the nuts and tap a screw-thread into the hole exactly in the center of each nut on its lower side, and at the same angle to the plane of revolution of the wheel which the spoke is to incline—that is, inclining the hole in one nut in one direction, and the next in the opposite direction, to fit the inclination of the spokes, as shown in Figs. 2 and 5. After the hollow rim is rolled out to shape in cross-section, and before its ends are brazed together, I insert the end of ribbon $n'$ into the open end of the rim and slide it along until each nut comes opposite its proper hole, when, by passing short screw-threaded wires or segments of spokes into the spoke-holes in the rim like the portions of the spokes shown and screwing them into the nuts, I hold the latter in proper position until the ends of the rim are brazed together. If desired, the ribbon $n'$ may also be sweated at one or more points to the rim while in this position. When the rim has its ends brazed together, the spokes may be screwed into the nuts $n$ in the usual way.

In case the nut is to be made to revolve instead of the spoke in inserting the latter in the rim, I insert the nuts in the ribbon $n'$ so as to be capable of revolving, and make the holes in the rim on its inner periphery large enough to receive the body part of each nut. I then insert the ribbon n' into the rim before its ends are soldered together, or even before it is rolled into shape transversely, and introduce the nuts into their respective holes. It is of course understood that the rim is to be rolled into shape transversely from a complete metal tube without any open seam or joint after the rolling process. This method of introducing the nuts $n$ $n$ serves to strengthen the rim so as to prevent the lips $r$ $r$ from spreading at any one point and allowing strips $s$ $s$ to escape therefrom.

What I claim as new and of my invention is—

1. The combination of the wheel-rim provided with inwardly-projecting lips $r r$, the tire provided with the slots $t$ $t$, and the metallic strips $s$ $s$, embracing the surface of the tire and projecting into its slots, and interlocking under the lips $r$ $r$, substantially as described.

2. In combination with the hollow rim formed from a tube by rolling, and provided with a series of holes on one side to receive the spokes, the metallic ribbon $n'$, having attached thereto the series of nuts $n$ $n$, placed at such intervals thereon as to register with said holes in the rim, and introduced into the same at one end, substantially as described.

DAVID HALL RICE.

Witnesses:
WILLIAM P. BLAKE,
N. P. OCKINGTON.